United States Patent

[11] 3,574,426

[72] Inventor Edgar J. Ruof
 Akron, Ohio
[21] Appl. No. 871,512
[22] Filed Oct. 27, 1969
[45] Patented Apr. 13, 1971
[73] Assignee The Goodyear Tire & Rubber Company
 Akron, Ohio
 Continuation of application Ser. No.
 814,865, Jan. 16, 1969, which is a
 continuation of application Ser. No.
 593,150, Nov. 9, 1966, now abandoned.

[54] SKID CONTROL SYSTEM
 21 Claims, 4 Drawing Figs.
[52] U.S. Cl.................................................. 303/21,
   303/20
[51] Int. Cl...................................................... B60t 8/08,
   B60t 13/66
[50] Field of Search........................................... 303/20, 21

[56] References Cited
 UNITED STATES PATENTS
2,957,658 10/1960 Nichols........................ 303/21X
3,022,114 2/1962 Sampietro..................... 303/20X
3,076,530 2/1963 Schaub......................... 188/181
3,260,555 7/1966 Packer......................... 303/21

Primary Examiner—Duane A. Reger
Attorneys—F. W. Brunner and Paul E. Milliken

ABSTRACT: An antiskid brake control system particularly designed for aircraft which includes a hydraulic braking pressure supply to each wheel with independent valves to adjustably restrict the hydraulic pressure actually applied to each wheel. An electrical voltage is generated by wheel rotation indicating the rate of rotation. The balance of a normally balanced bridge circuit is upset sometime after this voltage begins to change at an excessive rate indicative of a skidding deceleration and then causes a signal to be sent to the respective independent valve associated with the wheel to restrict the hydraulic pressure to the respective brake. The lag between the onset of a skidding deceleration and the time at which the balance of the bridge is upset directly depends upon the severity of the skid.

INVENTOR.
EDGAR J. RUOF

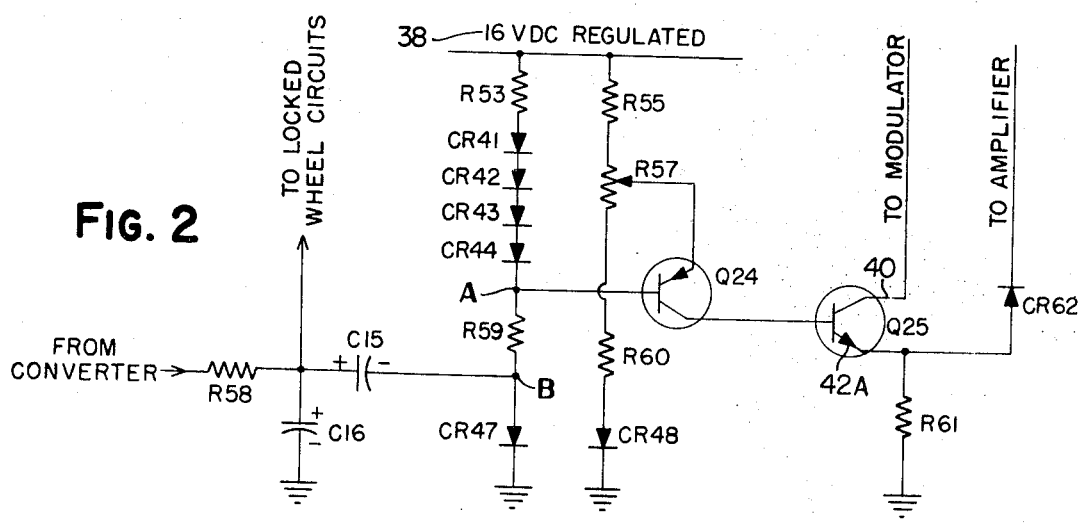
FIG. 2
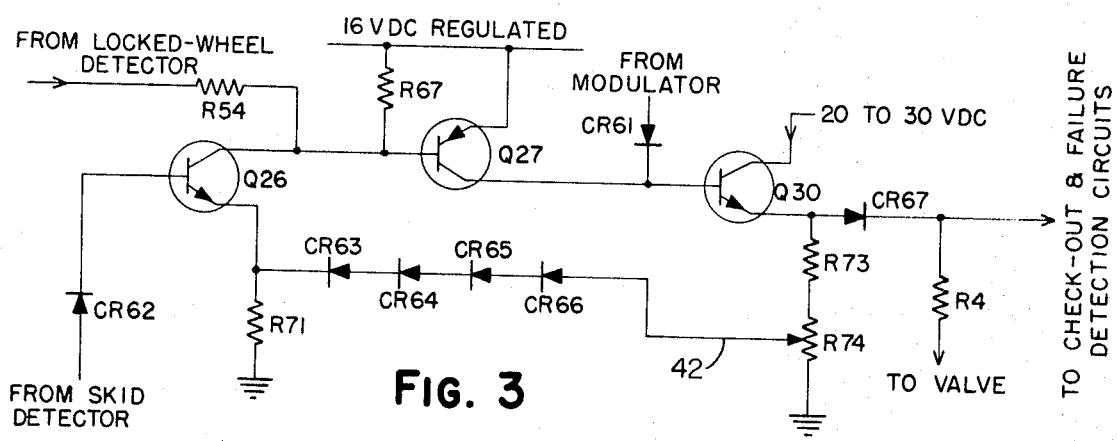
FIG. 3
FIG. 4
INVENTOR.
EDGAR J. RUOF
BY
Oldham & Oldham
ATTORNEY

SKID CONTROL SYSTEM

CROSS-REFERENCE TO RELATED APPLICATIONS

This is a continuation of my copending application, Ser. No. 814,865 filed Jan. 16, 1969, which in turn is a continuation of my application Ser. No. 593,150 filed Nov. 9, 1966, both now abandoned.

This invention relates to brake control systems for vehicles, and more particularly to such systems for vehicles having several independently rotatable load-bearing wheels each of which is equipped with a respective unit comprising a brake and a brake-applying means. As herein illustrated and described the invention is applied specifically in connection with an aircraft, and is designed to achieve braking action without skidding, and in the shortest possible distance of aircraft travel.

Heretofore, it has been well known that there have been many and various types of antiskid systems, both mechanical and electrical, for use with railroad equipment and aircraft. One specific patent on a recent aircraft antiskid system is U.S. Pat. No. 3,245,727. It is the specific purpose of this invention to improve upon the operation of that patent by introducing more reliable control circuitry, which insures a faster responding system and hence aircraft stopping in the shortest possible distance.

Thus, it is the general object of the present invention to provide an improvement in the antiskid brake control art by the provisions of a unique bridge control circuit in the skid detection unit to very accurately and precisely determine when skid conditions occur.

A further object of the invention is to provide an amplifier circuit operating in conjunction with the skid detector with feed back to maintain a precise brake pressure relief under all skidding conditions.

A further object of the invention is to provide a modulation circuit which operates in conjunction with the skid detector to carefully reapply pressure to the brake at the maximum possible pressure without producing another skid condition.

The aforesaid object of the invention and other objects which will become apparent as the description proceeds are achieved by providing in an antiskid braking system the combination of a rotatable wheel, means to supply hydraulic braking pressure to the wheel, valve means to adjustably restrict hydraulic pressure actually applied to the wheel, means to represent the wheel rotation as an electrical signal, and electrical circuit means normally balanced on nonskidding wheel deceleration becoming unbalanced on skidding deceleration of the wheel to provide a control signal to the valve means to cause a dump of a controlled portion of the hydraulic pressure applied to the wheel.

For a better understanding of the invention, reference should be had to the accompanying drawings wherein:

FIG. 2 is an electrical schematic diagram of the skid detector circuit portion of the control diagram of FIG. 1;

FIG. 3 is an electrical schematic of the amplifier portion of the control circuit; and FIG. 4 is an electrical schematic of the basic components in the modulator portion of the control circuit.

Figure 1:
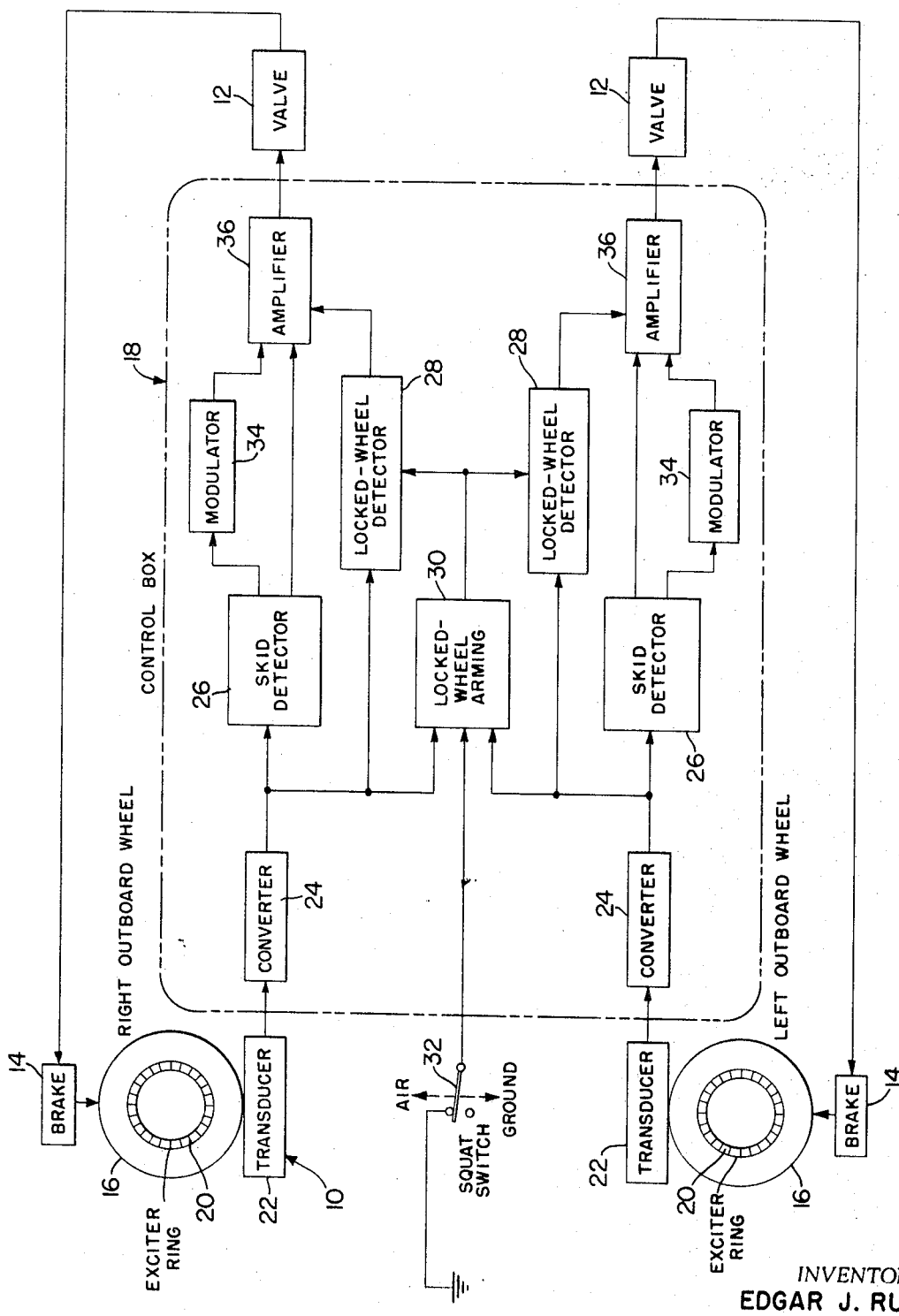
FIG. 1 is a block diagram depicting the required components of a control system with an indication of the direction of the control functions.

In essence, the antiskid system of the invention comprises three types of components. The block diagram of FIG. 1 which shows two separate wheel systems, illustrates these three components which are wheel speed sensors 10, the valves 12 supplying hydraulic fluid under pressure to the brakes 14 associated with the rotatable wheels 16, and the control box indicated generally by numeral 18.

Preferably, each valve 12 is not the on-off type, but is instead a valve, for example a flapper-nozzle type, which reduces the outlet pressure from the inlet pressure by an amount that is proportional to the coil current. Each brake has its own valve.

The control box 18 contains all the circuits for properly controlling the valves 12. There is a separate electrical skid-control circuit for each valve.

In the specific embodiment of the invention, the wheel-speed sensor is a magnetoelectric pulse generator, which is made up of a transducer 22 and an exciter ring 20. The exciter ring 20 is a ferrous gearlike ring which has a plurality of internal teeth. It is located in the hubcap and therefore it rotates with the wheel. The transducer 22 contains a magnet and a coil, and it is located on the end of the axle in such a way that the exciter ring rotates concentrically about it as the wheel turns. One electrical pulse is produced for each tooth on the exciter ring so that there is a specific number of electrical pulses for each rotation of the wheel.

The electrical pulses generated in the transducer 22 are sent to a converter 24 in the control box which uses them to produce a DC voltage which is directly proportional to the frequency of the pulses. This DC voltage from the converter 24 represents the speed of the wheel at a ratio of any specific number of volts per mile per hour. For example, with a ratio of 0.10 volts per mile per hour, at 70 miles per hour, the speed of the wheel would be such that the frequency of the pulses would cause the converter to give an output voltage of 7.0 volts. The level of the DC voltage from the converter depends upon wheel speed and therefore it changes as the speed of the wheel changes. It is the behavior of this DC voltage that controls the operation of the antiskid system, as more fully explained hereinafter.

The DC voltage from the converter goes to a skid detector circuit 26, a locked-wheel detector circuit 28, and a locked-wheel-arming circuit 30. The skid detector 26 responds only to a sudden drop in the DC voltage, whereas the locked-wheel detector 28, and the locked-wheel-arming circuits operate at any preselected voltage representing low speeds, for example at 1.0 volts (10 miles per hour), and 2.0 volts (20 miles per hour) respectively.

The locked-wheel detector 28 causes the brake pressure to be dumped whenever the wheel speed is less than such preselected speed such as 10 miles per hour, if the locked-wheel-arming circuit is energized. If the locked-wheel-arming circuit is not energized, the locked-wheel detector cannot operate.

The locked-wheel-arming circuit is energized whenever the aircraft is airborne which allows a squat switch 32, well known in the art, to be closed, and whenever the aircraft speed is above 20 miles per hour, as a selective value. While the aircraft is airborne, the squat switch 32 remains closed which keeps the locked-wheel-arming circuit energized. Before landing, the wheels are not turning and brake pressure is therefore dumped by the locked-wheel detector 28. This assures that brakes cannot inadvertently be applied at touchdown.

However, during the landing run the locked-wheel detector usually is not called upon to operate because the skid detector 26 and a modulator circuit 34 normally takes care of all skid-control requirements. However, if unusual conditions occur, such as aquaplaning which may cause a wheel to degenerate to less than 10 miles per hour, the brake pressure will be dumped by the locked-wheel detector and will be held dumped until the wheel recovers to 10 miles per hour or more. At aircraft speeds less than the exemplary 20 miles per hour, such as when low-speed taxiing and parking are attempted, the locked-wheel-arming circuit 30 is not energized and, therefore, the locked-wheel detector circuit 28 does not interfere with normal low speed operation.

The skid-detector circuit 26 senses the existence of a skidding condition and provides a dump signal in response thereto. The dump signal is immediately sent to the antiskid valve 12 via an amplifier circuit 36 and at the same time, the skid detector circuit 26 sends the signal to the modulator 34. The modulator then automatically establishes the amount of electrical signal that will remain on the valve after the wheel has recovered from the skid. This electrical signal from the modulator 34 to the amplifier 36 will continue to hold the valve 12 partly energized after the skid has been corrected. The actual level of this electrical signal is automatically determined and is such that brake pressure will be reapplied at a slightly lower pressure than the pressure which caused the skid. The modulator 34 then allows the electrical signal to slowly decay which causes the brake pressure to slowly increase until another skid occurs.

As mentioned above, the control box shown in FIG. 1 illustrates the antiskid system for one pair of two wheels, either the inboard pair or the outboard pair. However, functionally each wheel has its own antiskid circuit, and no pairing is done except that each pair of wheels shares a common locked-wheel-arming circuit 20.

The skid-detector circuit 26 is shown in more detail in FIG. 2. Specifically, the skid detector comprises a normally balanced bridge with two opposed legs connected from a 16VDC-supply through to ground. One leg includes resistor R53, diodes CR41—CR44, resistor R59 and diode CR47. The other leg includes resistors R55 and R60, potentiometer R57, and diode CR48. The connection of a PNP transistor Q24 from a slider on potentiometer R57 to a point A between diode CR44 and resistor R59 sets up a bridge balance between the two legs of the skid detector 26. Transistor Q24 is normally nonconductive because the slider of the potentiometer R57 is set to act under a balanced condition in conjunction with resistors R55 and R60 to define a voltage which is slightly below the point of conduction for Q24. The diode string consisting of CR41, CR42, CR43, and CR44 provides temperature compensation so that the turn-on point for transistor Q24 remains stable throughout the temperature range of −65° F. to 160° F.

Resistor R58 and capacitor C16 form an RC filter for the removal of any unwanted ripple voltages received as the DC input from the converter 24. This filtered DC voltage is then sent to the locked-wheel-arming and the locked-wheel-detector circuits, as explained above, as well as to a control capacitor C15.

In the specific example of the invention, the capacitor C15 is a 22 microfarad capacitor which is charged to the filtered DC converter voltage. A diode CR47 provides a low-impedance charge path so that the capacitor C15 is rapidly charged by the DC voltage signal developed in the converter 24 to a voltage corresponding to wheel speed upon wheel spin-up at touchdown and also quickly recharged upon recovery from a skid.

After touchdown, if no skid occurs and the aircraft gradually slows down, the DC output of the converter will gradually decrease and the capacitor C15 will gradually discharge. The discharge current will be taken from the steady-state current that normally goes through the diode CR47. Throughout all this the voltage between Point A and the pickoff point on the potentiometer R57 remains substantially constant and the transistor Q24 remains nonconductive, since no skid has occurred.

When the associated wheel decelerates the DC output from the converter drops at a rate proportional to the deceleration encountered. The definition of a skid is that deceleration which causes the output of the converter to drop at a rate which is faster than the capacitor C15 can be discharged by the steady state current normally flowing through the diode CR47, and can be anything desired for the parameters of the system. When a skid occurs the voltage between Point B and the ground starts to fall and this, in turn, causes the voltage between Point A and ground to fall, thereby reducing the back bias applied across the base-emitter junction of the transistor Q24. Detector 26 does not provide the dump signal on every skid, but only in response to those that are sufficiently severe to drop the voltage between Point A and ground far enough to cause conduction of the transistor Q24. Such a severe skid is what is referred to hereinafter as a "skid" or a "skidding condition." Of course, the severity of the skid required to cause conduction of the transistor Q24 depends upon the back bias applied across its base-emitter junction, as well as upon the characteristics of the transistor itself. For example, the required drop in the voltage between Point A and ground for conduction of the transistor Q24 may be 0:7 volts, the equivalent of an instantaneous drop in wheel speed of 7 miles per hour.

Conduction by the transistor Q24 causes conduction by transistor Q25 which serves a dual purpose. Specifically, the collector 40 of transistor Q25 provides a control input to the modulator 34, which circuit is described in more detail later, and its emitter 42A of sends a voltage to the amplifier 36 thus causing the amplifier 36 to drive the valve to any predetermined dump relationship.

A resistor R61 drains off any leakage by transistor Q25 thus eliminating any partial-dump signals being sent to the amplifier by leakage that might occur at high ambient temperatures. The resistors R53, R55, R59, and R60 are parts of the bridge circuit, as are diodes CR41, CR42, CR43, CR44, CR47 and CR48 which are simply necessary to stabilize the other components in the circuit to against possible current fluctuations due to ambient temperature variations.

The amplifier circuit is shown in FIG. 3. This circuit amplifies signals from the skid detector 26, the locked-wheel detector 28, and the modulator 34 so that they will be strong enough to operate their respective valve 12.

Each signal from the skid detector to the amplifier is of the same amplitude regardless of the magnitude of the skid. The skid detector signal is applied to the base of a transistor Q26 which then turns on transistors Q27 and Q30 thus sending a dump signal to the valve 12. Feedback from the emitter of transistor Q30 to the emitter of transistor Q26 over line 42 is used to limit the amplitude of all dump signals initiated by the skid detector 26 so that the brake pressure is not dumped entirely, but is instead dumped only to the point where clearance of the brake discs would begin to occur if pressure were permitted to go lower. This cuts to a minimum the amount of fluid that is dumped from the brake during the correction of a skid and thus minimizes reapplication time since very little fluid is used in the brake after the initial quantity required to take up the clearance when brakes are first applied by the pilot or operator of the aircraft.

Whenever a skid occurs, the amplitude of the signal from the skid detector 26 is slightly less than the voltage between the slider of the potentiometer R57 in the skid detector, as seen in FIG. 2. The voltage which then appears at the emitter of transistor Q26 in FIG. 3 is developed by the same current that turns on transistor Q27. The resulting dump signal by transistor Q30 causes a voltage to be developed at the slider of the potentiometer R74 which is fed back through feed back line 42 including a series of four diodes to the emitter of transistor Q26. After the sensitivity of the system has been set by adjustment of the slider position on the potentiometer R57, the amplitude of the dump signal may be set by adjustment of the slider position on the potentiometer R74. The diode string CR63 through CR66 is used to provide temperature compensation, thus insuring that the dump signal to the valve 12 will be of the proper amplitude regardless of the ambient temperature of the control box. The settings of the sliders of the potentiometers R57 and R74 have no effect on the signals from the locked-wheel detector 28 or the modulator 34.

Resistor R67 prevents emitter-collector leakage by transistor Q27 at high temperature. Diode CR61 causes all collector current from the transistor Q27 to go to the base of the transistor Q30 by blocking this current and preventing its loss through the modulator circuit. Diode CR67 isolates the valve circuit from resistor R73 and potentiometer R74 so that check out and failure detection will not give erroneous indication when checking the valves for continuity.

The purpose of the modulator 34 is to control the manner in which brake pressure is reapplied following a skid. After a skid has occurred, the pressure must quickly be reapplied, but it must be somewhat lower than the pressure which caused the skid; and after application, the pressure must slowly climb.

The main requirements of the modulator are: 1. Proper modulating level must quickly be reached after brake application regardless of runway conditions. 2. Following each skid the modulator must control the valve so that brake pressure is quickly reapplied at a slightly lower level than the which caused the skid, and then it must cause a gradual increase in pressure so as to cause another skid. 3. The modulator circuit itself must not be capable of causing a full dump of the brake.

FIG. 4 shows the modulator circuit 34. Each time a skid occurs transistor Q20 is turned on by transistor Q25 of the skid detection circuit for the duration of the skid. Between skids the transistor Q20 is nonconductive, but when a skid occurs, it is completely turned on and its collector voltage becomes approximately the same as its emitter voltage. A capacitor C18 then begins to charge through an adjustable resistor or rheostat R64, but the R64—C18 time constant is such that the capacitor C18 generally does not become fully charged. The actual charge reached depends upon the time duration of the skid.

When the skid has been corrected, transistor Q20 immediately becomes nonconductive. Capacitor C18 then quickly discharges through the diode CR51 and a selected portion of a potentiometer R62 so that with each new skid the charging of C18 begins with no leftover charge from the previous skid. During the charging of C18, a corresponding voltage is developed across resistor R65 by conduction of transistor Q29 which acts as an emitter follower for the voltage on capacitor C18. Conduction by the transistor Q29 causes conduction of the transistor Q28. However, the voltage at the collector of Q28 is higher than the voltage at the emitter of the transistor Q29 because of the voltage drop across the six diodes CR52 to CR57. The voltage at the collector of the transistor Q28 is applied through diode CR58 to capacitor C19.

The voltage of the capacitor C19 is the modulator voltage which is applied to the valve between skids. The current required by the valve is too great to be supplied directly by the capacitor C19, and hence transistors Q31 and Q32 are used to provide current amplification.

The diodes CR52 to CR57 are used to provide temperature compensations so that the voltage of capacitor C19 will be as required to provide the proper valve voltage throughout the broad temperature range set forth above. As the temperature goes down, the voltage loss over the transistor Q31, the diode CR61 and the semiconductors in the other amplifier goes up which would result in a lower valve voltage if the voltage of capacitor C19 were not boosted by the compensating action of the diodes CR52 to CR57.

The operation just described covers one of the two branches of the modulator. That branch enables the modulator voltage to reach the proper operating level on the first cycle of antiskid action, and also provides a rapid increase in the modulator voltage if the aircraft encounters a sudden drop in runway coefficient.

The second branch of the modulator provides a constant amplitude, low-level pulse for adding to the charge of capacitor C19 because many skids are too short to provide added charge for the capacitor C19 through the previously described comprising the first branch. The amplitude of this pulse is established by the laboratory or factory setting of the slider of a potentiometer R62. Between skids, capacitor C17 becomes charged to approximately the voltage of capacitor C19 because between skids the voltage at the emitter of transistor Q31 is established by the voltage of the capacitor C19, and the time constant of the RC circuit comprising the resistor R70, potentiometer R62, and capacitor C17 is comparatively short. The start of each new skid therefore finds capacitor C17 charged to almost the same voltage as the capacitor C19. The pulse which is developed at the slider of the potentiometer R62 during the skid adds to the voltage of the capacitor C17 and thereby causes the capacitor C19 to receive added charge through diode CR60 and resistor R66.

Diodes CR49 and CR50 provide temperature compensation for voltage regulator VR2, since such voltage tends to go up as the temperature goes up. Diodes CR58 and CR60 prevent discharge of capacitor C19 through undesired paths. Diode CR59 prevents loss of the constant-amplitude pulses through resistor R70 and the amplifier. A rheostat R68 and R69 establish the discharge rate of capacitor C19 and therefore establish the rate of increase of brake pressure between skids. The voltage that exists on capacitor C19 after a skid establishes the level at which brake pressure will be reapplied after the skid. The setting of the slider of a rheostat R47 establishes the maximum voltage to which capacitor C18 (and, therefore, the capacitor C19) can climb as the result of an abnormally long skid during which capacitor C18 might become fully charged.

Thus, it should be understood that the first branch of the modulator circuit effectively provides the modulator voltage to reach the proper operating level on the first cycle of antiskid action, while the second branch takes over and provides for many low level skids which do not have sufficient strength to increase the voltage on capacitor C19, through the first branch.

While the particular automatic brake control system herein shown and disclosed in detail is fully capable of obtaining the objects and providing advantages hereinbefore stated, it is to be understood that it is merely illustrative of the presently preferred embodiment of the invention and that no limitations are intended to the details of the construction or design herein shown other than as defined in the appended claims.

I claim:

1. An antiskid braking system for a rotatable wheel equipped with a hydraulic pressure responsive braking unit and an associated electronically responsive control valve for adjustably restricting the hydraulic pressure supplied to said braking unit, said control system comprising the combination of,
speed sensing means to represent the wheel rotation as an electrical signal,
a normally balanced bridge circuit, and
electrical circuit means coupled to said bridge and responsive to an excessive rate of change of the electrical signal for unbalancing said bridge circuit in response to a skidding deceleration of the wheel to thereby provide a control signal for the valve means to cause a dump of all but a predetermined portion of the hydraulic pressure applied to the braking unit.

2. An antiskid system according to claim 1 which includes an amplifier circuit to receive the control signal from the bridge circuit and pass it as a uniform magnitude signal to the valve means regardless of the magnitude of the unbalance on the bridge circuit.

3. A combination according to claim 2 where the amplifier circuit includes a feedback to effectively limit conduction thereof when the voltage from the bridge circuit reaches a predetermined level.

4. A combination according to claim 1 which includes a modulation circuit to adjust the valve means to a hydraulic pressure slightly lower than the which caused a skid upon returned braking operation after actuation of the valve means by the bridge circuit, and which modulator circuit further allows a slow increase in the pressure applied by the valve means until another skid condition is approached.

5. A combination according to claim 4 where the modulator circuit includes a first branch and a second branch wherein the first branch acts and responds to the initial skid to properly and initially set said modulator response, and the second branch operates in response to all subsequent minor or approaching skid conditions to provide a modulation signal.

6. A combination according to claim 5 where the modulation characteristics of both the first and second branches can be adjusted to provide desired response characteristics and circuit parameters.

7. A combination according to claim 1 where the bridge circuit can be adjusted to provide a selected response characteristic to wheel deceleration.

8. A combination according to claim 6 where all circuits include diodes to control current flow and provide temperature stability.

9. In an antiskid braking system the combination of a plurality of rotatable wheels, means to supply hydraulic braking pressure to each wheel, independent valve means to adjustably restrict the hydraulic pressure actually applied to each wheel, means to represent the speed of rotation of each wheel as a DC voltage, and a separate antiskid detection circuit for each wheel, each detection circuit including a normally balanced bridge circuit and a circuit means coupled to said bridge circuit and responsive to said DC voltage for increasingly upsetting the balance of said bridge in response to a skidding deceleration of its respective wheel, said bridge circuit causing a signal to be sent to the respective independent valve means to restrict the hydraulic pressure to the respective brake upon its balance being upset by a predetermined amount.

10. The antiskid braking system of claim 1 wherein said speed sensing means provides a DC voltage with an amplitude proportional to the instantaneous rotary speed of said wheel, said bridge circuit includes first and second parallel legs, an electronic switching device having an input circuit coupled between respective points on said first and second legs and an output circuit coupled to said valve, and means for supplying a respective quiescent current flow through each of said legs to establish across said points under quiescent operating conditions a potential difference of predetermined magnitude sufficient to maintain said switching device in a first state, said switching device being effective when switched to a second state to provide said control signal for said control valve, and said electrical circuit means includes rate sensing means coupled between said speed sensing means and said first leg of said bridge circuit, said rate sensing means causing a change in the potential difference existing across said points in a sense tending to switch said switching device to its second state in response to changes in the amplitude of said DC signal at rates in excess of a maximum deceleration rate while leaving said potential difference substantially at said predetermined magnitude in response to changes in the amplitude of said DC signal at all other rates.

11. The antiskid braking system of claim 10 wherein the control signal delivered to said control valve when said switching device is switched to its second state is of fixed amplitude, so that the hydraulic pressure supplied to said braking unit is reduced to a predetermined level whenever said switching device is switched to its second state.

12. The antiskid braking system of claim 11 wherein said braking unit comprises a pair of surfaces which are brought into contact to brake said wheel, and the predetermined level to which said hydraulic pressure is reduced when said switching device is switched to its second state is selected to be the pressure level at which clearance of said surfaces would begin to occur if the hydraulic pressure supplied to said braking unit was reduced any further, whereby the quantity of hydraulic fluid supplied to said braking unit is minimized and response time is improved.

13. The antiskid control system of claim 10 wherein said rate sensing means comprises a capacitor which is charged by said DC signal as the rotary speed of said wheel increases and discharged by the quiescent current flow through said first leg of said bridge circuit as the rotary speed of said wheel decreases, said quiescent current flow through said first leg of said bridge circuit being the only current flow required to discharge said capacitor at substantially the rate of change in the amplitude of said DC signal for all rates of change of said amplitude up to said maximum deceleration rate.

14. The antiskid braking system of claim 13 wherein additional current flow for discharging said capacitor is drawn through the input circuit of said switching device when the rate of change of said DC signal exceeds said maximum deceleration rate and after the potential difference between said points on said bridge circuit has changed by a predetermined amount.

15 The antiskid braking system of claim 14 wherein
said braking unit comprises a pair of surfaces that are brought into contact to brake said wheel, and
the control signal supplied to said valve when said switching device is switched to its second state has a predetermined amplitude selected to reduce the hydraulic pressure supplied to said braking unit to a pressure level at which clearance of said surfaces would begin to occur if the level of the hydraulic pressure supplied to said braking unit was reduced any further, whereby variations in the level of hydraulic pressure supplied to said braking unit are minimized.

16. An antiskid brake control system for a rotatable wheel equipped with a hydraulic pressure responsive braking unit and an associated electrically responsive proportional control valve for adjustably restricting the hydraulic pressure supplied to said braking unit, said control system comprising the combination of a skid detector means coupled to said wheel for providing an output signal of substantially fixed amplitude in response to any skidding deceleration of said wheel, an amplifier means coupled between said skid detector means and said control valve for applying a first control signal of substantially fixed amplitude to said control valve in response to said output signal to relieve all but a predetermined portion of the hydraulic pressure applied to said braking unit, thereby permitting said wheel to recover from said skidding deceleration, and modulator means coupled between said skid detector means and said control valve for supplying to said control valve a second control signal which gradually decays following recovery from a skidding deceleration from a level determined by the frequency and duration of the output signals from said skid detector means to thereby provide a gradually increasing upper limit for the hydraulic pressure supplied to said braking unit.

17. The antiskid brake control system of claim 16 wherein said modulator means includes
a first capacitor connected to supply said second control signal by discharging through said control valve,
a first charging circuit coupled between said skid detector means and said first capacitor for charging said first capacitor during initial skidding deceleration of said wheel and during subsequent relatively long skidding decelerations of said wheel, and
a second charging circuit coupled between said skid detector means and said first capacitor for charging said first capacitor during subsequent relatively short skidding decelerations of said wheel,
whereby said first capacitor is charged at any given time to a voltage which is a function of the frequency and duration of and elapsed time since any past skidding decelerations of said wheel.

18. The antiskid control system of claim 17 wherein
the discharge of said first capacitor through said control valve is effected through a first relatively long time constant circuit, and
said first charging circuit includes a second capacitor a relatively long time constant circuit connected between said skid detector means and said second capacitor for charging said second capacitor in response to each skidding deceleration of said wheel to a voltage dependent upon the duration of said skidding deceleration, means coupled between said first capacitor and said second capacitor for establishing the proper initial charge on said first capacitor, and a relatively short discharge time constant circuit connected to said second capacitor for fully discharging said second capacitor between successive skidding deceleration of said wheel.

19. The antiskid control system of claim 18 wherein said second charging circuit includes
   a third capacitor,
   a first unidirectional relatively short time constant circuit coupled between said first and third capacitors for charging said third capacitor to a voltage proportional to the voltage on said first capacitor,
   a second relatively short time constant circuit coupled between said skid detector means and said third capacitor for changing the charge on said third capacitor in response to each skidding deceleration of said wheel, and
   a second unidirectional relatively short time constant circuit coupled between said first and third capacitors for discharging said third capacitor into said first capacitor to assure that the charge on said first capacitor is increased in response to each skidding deceleration of said wheel.

20. The antiskid control system of claim 17 wherein
   the discharge of said first capacitor through said control valve is effected through a first relatively long time constant circuit, and
   said second charging circuit includes another capacitor, a first unidirectional relatively short time constant circuit coupled between said first and said other capacitor for charging said other capacitor to a voltage proportional to the voltage on said first capacitor, a second relatively short time constant circuit coupled between said skid detector means and said other capacitor for increasing the charge on said other capacitor in response to each skidding deceleration of said wheel, and a second unidirectional relatively short time constant circuit coupled between said first capacitor and said other capacitor for discharging said other capacitor into said first capacitor to assure that the charge on said first capacitor is increased in response to each skidding deceleration of said wheel.

21. In an antiskid control system including an electrically responsive control valve for regulating brake pressure applied to a rotatable wheel and a skid detector coupled between said wheel and said control valve for initiating a first control signal for said valve to reduce the brake pressure applied to said wheel in response to any skidding deceleration of said wheel, a modulator for supplying a second control signal for said valve to establish a gradually increasing upper relatively for said brake pressure between successive skidding decelerations of said wheel; said modulator comprising the combination of a capacitor connected first through said valve to thereby provide said second control signal, a first charging circuit coupled between said skid detector and said capacitor for charging said capacitor during initial skidding deceleration of said wheel and during any subsequent relatively long skidding decelerations of said wheel, and a second charging circuit coupled between said skid detector and said capacitor for charging said capacitor during any subsequent relatively short skidding decelerations of said wheel.

PO-1050
(5/69)

UNITED STATES PATENT OFFICE
CERTIFICATE OF CORRECTION

Patent No. 3,574,426           Dated April 13, 1971

Inventor(s) Edgar J Ruof

It is certified that error appears in the above-identified patent and that said Letters Patent are hereby corrected as shown below:

Column 3, line 14, "20" should read --30--.

Column 4, line 11, delete "of";

line 20, delete "to".

Column 5, line 47, after "the" first occurrence, add

--other--;

line 47, after "the" second occurrence, delete

"other".

Column 6, line 6, after "and" second occurrence, add

--a resistor--;

line 28, "embodiment" should read --embodiments-- line 60, "the" should read --that--.

Column 10, line 16, delete "relatively" and insert --limit line 19, delete "first" and insert --to discharge Signed and sealed this 26th day of October 1971.

(SEAL)
Attest:

EDWARD M. FLETCHER, JR.                ROBERT GOTTSCHALK
Attesting Officer                       Acting Commissioner of P